United States Patent [19]

Otsuka

[11] Patent Number: 4,941,376

[45] Date of Patent: Jul. 17, 1990

[54] APPARATUS FOR CUTTING WEB FOR BEVERAGE CONTAINERS

[75] Inventor: Yuzo Otsuka, Tokyo, Japan

[73] Assignee: AB Tetra Pak, Lund, Sweden

[21] Appl. No.: 348,992

[22] Filed: May 8, 1989

[30] Foreign Application Priority Data

May 10, 1988 [JP] Japan .......................... 63-062037[U]

[51] Int. Cl.[5] .......................... B26D 1/62; B26D 7/06; B23D 25/06

[52] U.S. Cl. .......................................... 83/100; 83/54; 83/316; 493/342

[58] Field of Search .................... 83/100, 315, 316, 54; 493/342; 82/52, 1.11

[56] References Cited

U.S. PATENT DOCUMENTS

| | | | |
|---|---|---|---|
| 2,901,949 | 9/1959 | Paton et al. | 493/342 |
| 3,135,151 | 3/1961 | Link et al. | 83/100 X |
| 3,224,310 | 12/1965 | Bieri | 83/316 X |
| 3,808,861 | 5/1974 | Plegat | 83/315 X |
| 3,946,630 | 3/1976 | Roehrig et al. | 83/316 X |
| 4,319,505 | 3/1982 | Otake et al. | 83/316 X |
| 4,693,152 | 9/1987 | Grosz et al. | 83/100 X |
| 4,825,736 | 5/1989 | Cantanese | 82/1.11 |

*Primary Examiner*—Douglas D. Watts
*Assistant Examiner*—Kenneth E. Peterson
*Attorney, Agent, or Firm*—Koda & Androlia

[57] ABSTRACT

An apparatus for cutting a cylindrical web made of laminated paper into cylindrical bodies from which containers for beverages are formed including a pair of cutting blades provided with suction ports so that dust such as paper powder, etc. generated when the web is cut by the blades is sucked out through the suction ports connected to a suction device.

8 Claims, 4 Drawing Sheets

FIG.6
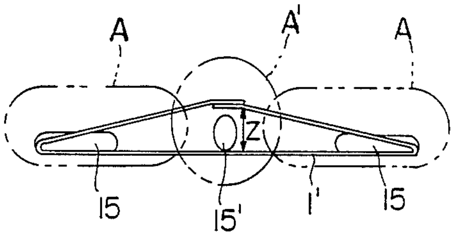
FIG.5
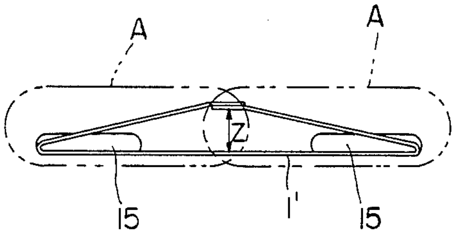
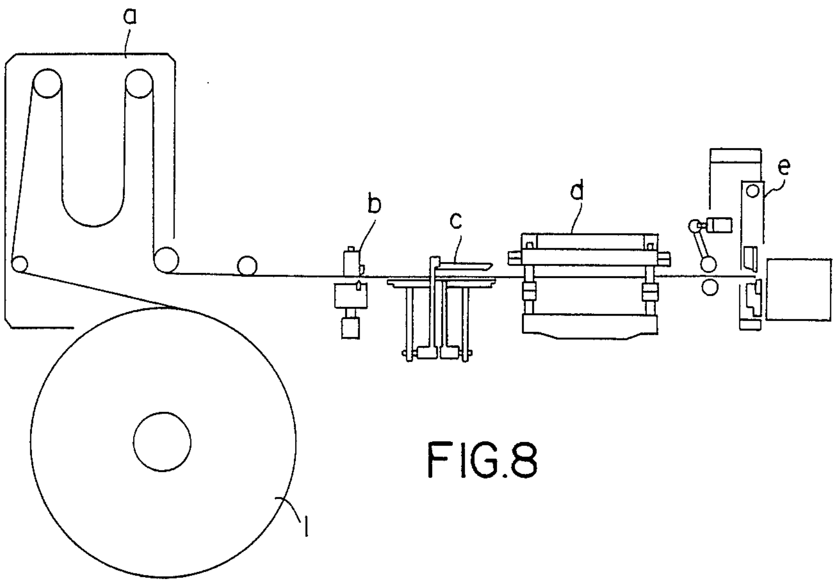
FIG.8

APPARATUS FOR CUTTING WEB FOR BEVERAGE CONTAINERS

BACKGROUND OF THE INVENTION

1. Field of the Invention

The present invention relates to an apparatus for cutting a web, and more particularly to an apparatus for cutting a web used in making beverage containers.

2. Prior Art

It is a general practice to pack beverages such as milk, juice, yogurt, etc. in paper containers. Such paper containers are usually made of laminated materials made up of a base material such as paper covered with a synthetic resin or metallic foil, depending upon the desired purpose.

When manufacturing such a container, both side edges of a continuous belt-like laminated material (hereinafter called a "web") are joined to form a cylindrical shape as shown in FIG. 7. The cylindrical web 1 is then cut into individual cylindrical bodies 1' having specified dimensions and made into package containers 1''. The containers 1'' are then filled with beverages via a filling device and sealed by a sealing device to make the final container 1'''.

FIG. 8 is a schematic illustration showing the above described process The rolled web 1 is fed out to a first cutter b by a feeding device a, and this first cutter b makes notches 3 on the web 1. The folding device c turns up both edges of the web 1 toward the center thereof, and the turned edges are joined by a sealing device d. The web 1 which is thus in a cylindrical shape is cut by a second cutter e into individual cylindrical bodies 1' of a predetermined size.

The web 1 is fed out intermittently so that it is cut by predetermined size by the cutter e, which is made up of upper and lower blades In order to feed the web 1 accurately, (as disclosed in Japanese Patent Application Laid-Open No. 59-118658 (1984)), notches 3 are provided on the web 1, and the upper and lower blades oscillate in a direction which is the same as the web 1 so that the notches 3 engages with the upper blade. Thus, cutting of the web 1 can be accurately controlled at the notches 3.

When cutting the web 1, it is unavoidable that a fine dust of paper powder, etc. will be generated, and so far there has been no conventional web cutting apparatus devised in the prior art which can remove the dust.

When packing the beverage, the most important to be concerned with is the sanitary problems; in other words, foreign materials must not be mixed into the beverage When the web 1 is cut by the upper and lower blades, it is necessary to maintain a highly sanitary atmosphere. However, when a web having a base material of paper is used, paper dust is generated, and there is no guarantee that such paper dust will not adhere to part of the container, such as the inner surface, and mix with the beverage. Nothing in prior art devices provide any means to solve such problems

SUMMARY OF THE INVENTION

Accordingly, it is a primary object of the present invention to provide a web cutting apparatus in which when the web is cut, paper powder dust is removed so as to ensure that the containers will be free of any foreign materials.

In other words, it is an object of the present invention is to provide a cutting apparatus for cutting a cylindrically shaped web into individual cylindrical bodies, and further to provide a cutting apparatus which is provided with dust collecting port for removing fine dust (such as paper powder) which may be generated when the web is cut.

The objects of the present invention are accomplished via a unique structure for a cutting apparatus wherein the cylindrically shaped web is independently cut into individual cylindrical bodies and wherein suction ports are provided on the side walls of the upper blade and/or the lower blade which face the sectional ends of the cylindrical body. The suction ports are connected to a suction device such as a blower, etc. so that air containing dust around the cut portion of the cylindrical body is sucked out.

It is more effective to locate at least a part of the suction port so that it directly faces the inner area of the cylindrical body. In addition, it is also very effective to design the apparatus such that the air sucked in by the suction port is discharged through a dust collector.

Further, by suspending a blade frame, wherein the upper and lower blades are provided, from a bar provided in the cutting apparatus so that the blade frame can oscillate, it is possible to utilize the oscillating movement of the blade frame to obtain a more accurate web cutting positioning. In such a case, a suction duct connected to the blower is provided in front of the blade frame, and the suction port and the suction duct are provided by a flexible tube.

With the above structure, when the web is cut by the upper and lower blades, a cut-out cylindrical body is positioned in front of the upper blade or the lower blade, and the air around the cut portion of the web is sucked through the suction port provided in the blades, thus fully removing paper powder and other dust generated during the cutting process.

When at least a part of the suction port directly faces the inner area of the cylindrical body which is formed by the resilience of the cut out cylindrical body itself, air can pass through this inner space and can be sucked through the suction port. Accordingly, not only is the dust around the sectional end removed, so is the dust inside the cylindrical body.

BRIEF DESCRIPTION OF THE DRAWINGS

The accompanying drawings show a web cutting apparatus for beverage containers according to the present invention, wherein;

FIGS. 5 and 6 are schematic views showing the positional relationship between the cut-out cylindrical body and the suction ports provided in the blade;

FIG. 8 is an illustration of a process for manufacturing paper packaging containers wherein the apparatus of the present invention is employed.

DETAILED DESCRIPTION OF THE INVENTION

The preferred embodiments of the web cutting apparatus for manufacturing a beverage container according to the present invention will hereinafter be described with reference to the accompanying drawings.

Figure 7:
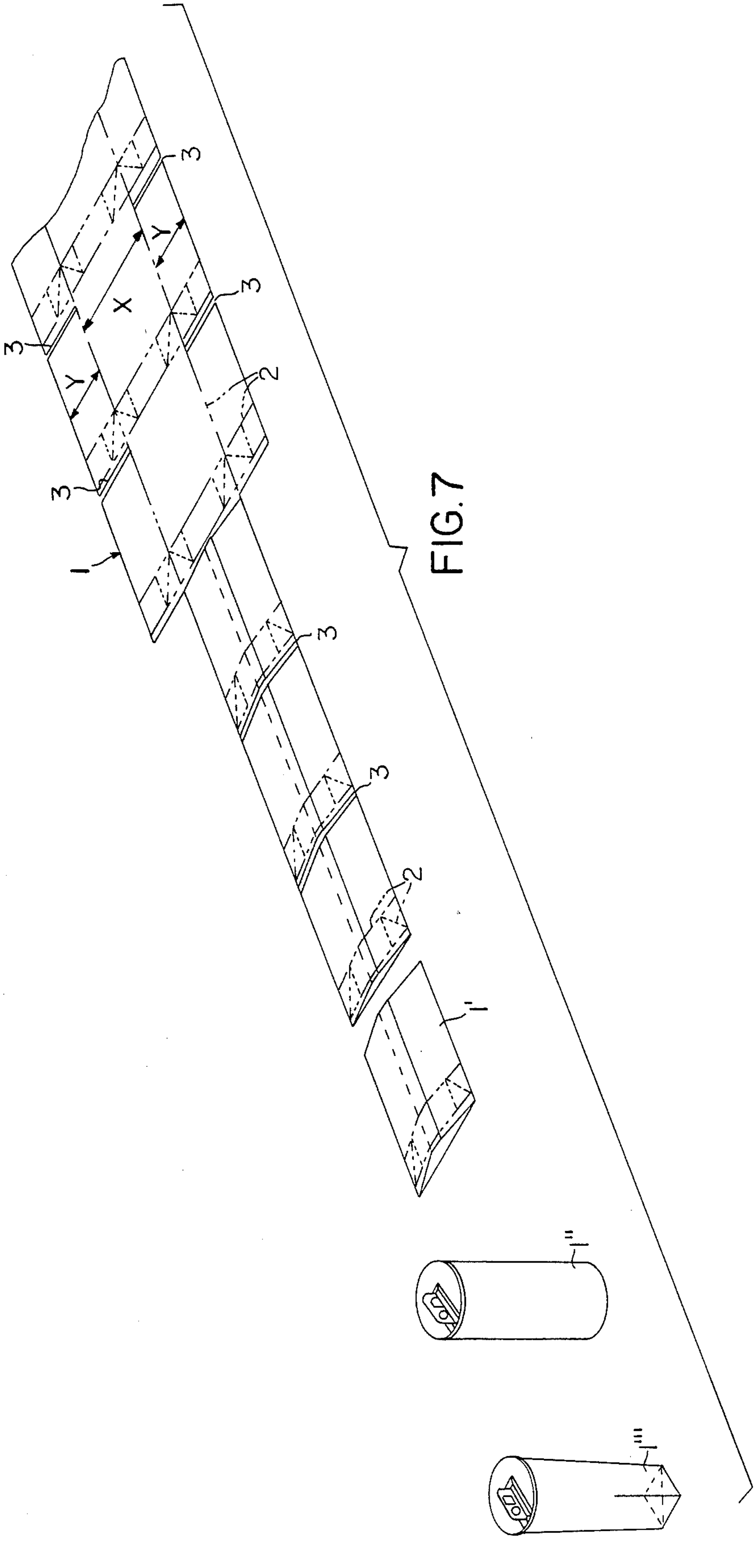
FIG. 7 is perspective view showing the web processing procedures for manufacturing beverage containers.

FIG. 7 shows an example of a package web wherein a flat, bank-like web 1 is turned up at the side edges so that the side edges are joined to form a cylindrical shape. The web 1 thus formed into a continuous cylindrical shape is cut at specified (notched) positions, and thus individual cylindrical bodies which become the beverage containers are formed.

This web 1 is provided with two bend-guide lines 2 which are parallel to the side edges of the web 1 so that the web 1 is bent along these bend-guide lines 2 to form a cylindrical shape. The web 1 is also provided with notches 3 so that after being bent along the bend-guide lines 2, the web 1 is cut along the notches 3 to make a single cylindrical body 1'. The two bend-guide lines 2 are spaced apart from each other a distance X and are also spaced apart from the side edges of the web 1 a distance Y. These distances X and Y are arranged so that the two times the distance Y is greater than the distance X; or in other words:

$$X<2Y$$

Thus, the cylindrical body 1' formed by joining the two side edges of the web 1 has a substantially triangular inner area having a height Z as seen in FIGS. 5 and 6.

Figure 2:
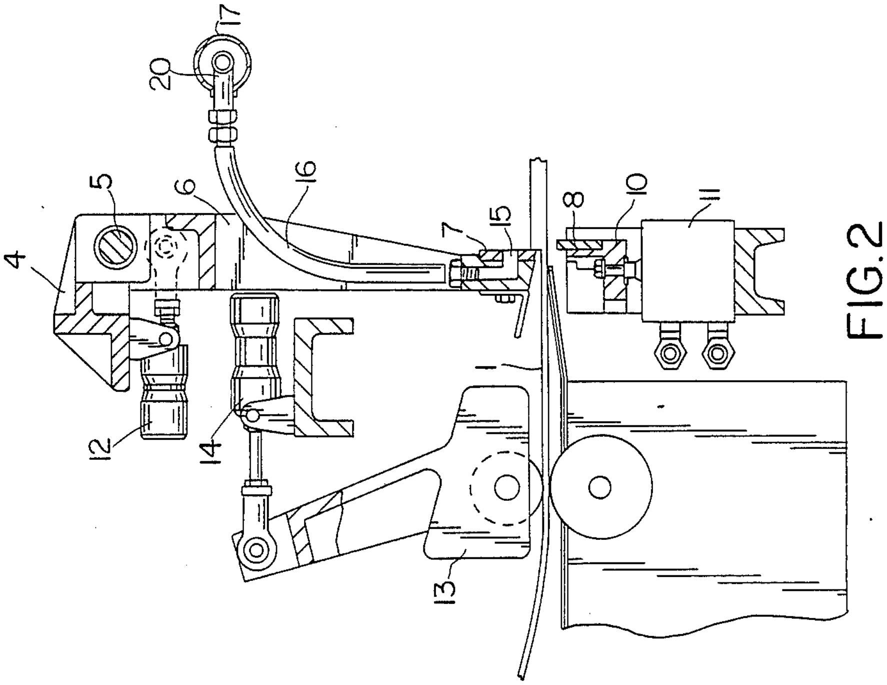
FIG. 2 is a partially cut-away side view of FIG. 1.
Figure 1:
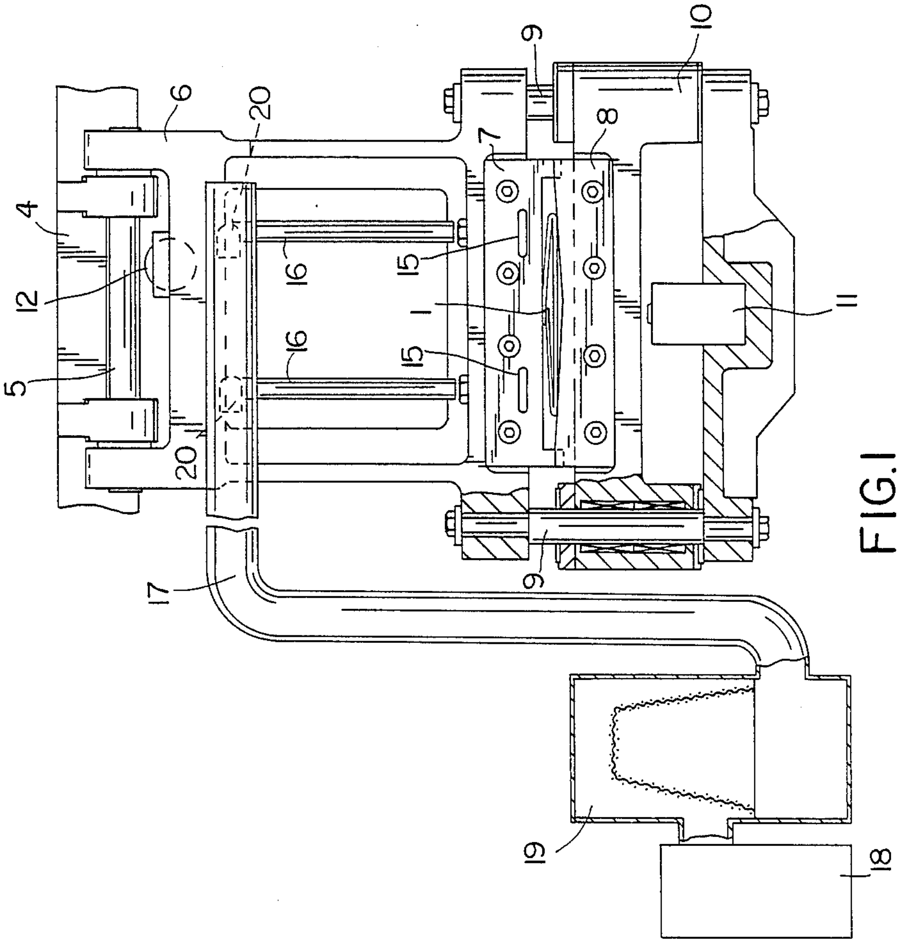
FIG. 1 is a front partial view of the cutting apparatus.

In FIG. 1, a blade frame 6 which oscillates in the advancement direction of the web 1 is provided on a horizontal bar 5 which is mounted on a main body frame 4 of the cutting apparatus. In other words, the blade frame 6 is suspended from the horizontal bar 5 and is swingable to the right and left as seen in FIG. 2 about the bar 5.

The blade frame 6 is provided with an upper blade 7 and a lower blade 8. The upper blade 7 is securely fixed to the blade frame 6, and the lower blade 8 is fixed to a lower blade supporting block 10 which is vertically slidable along guides 9 at a specified position. Thus, when the web 1 is brought between the upper and lower blades 7 and 8, it is cut by these two blades when the lower blade supporting block 10 is moved vertically toward the upper blade 7.

Figure 4:
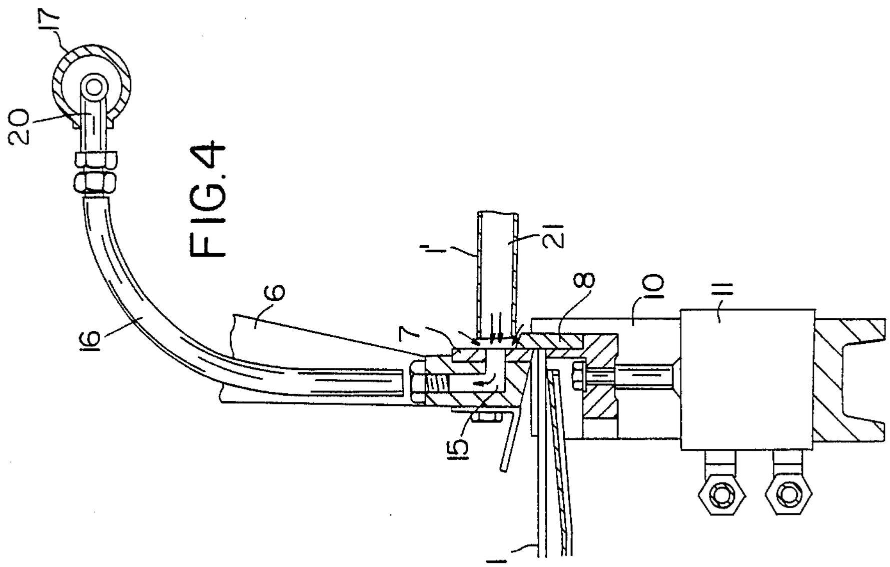
FIG. 4 is a side view thereof.
Figure 3:
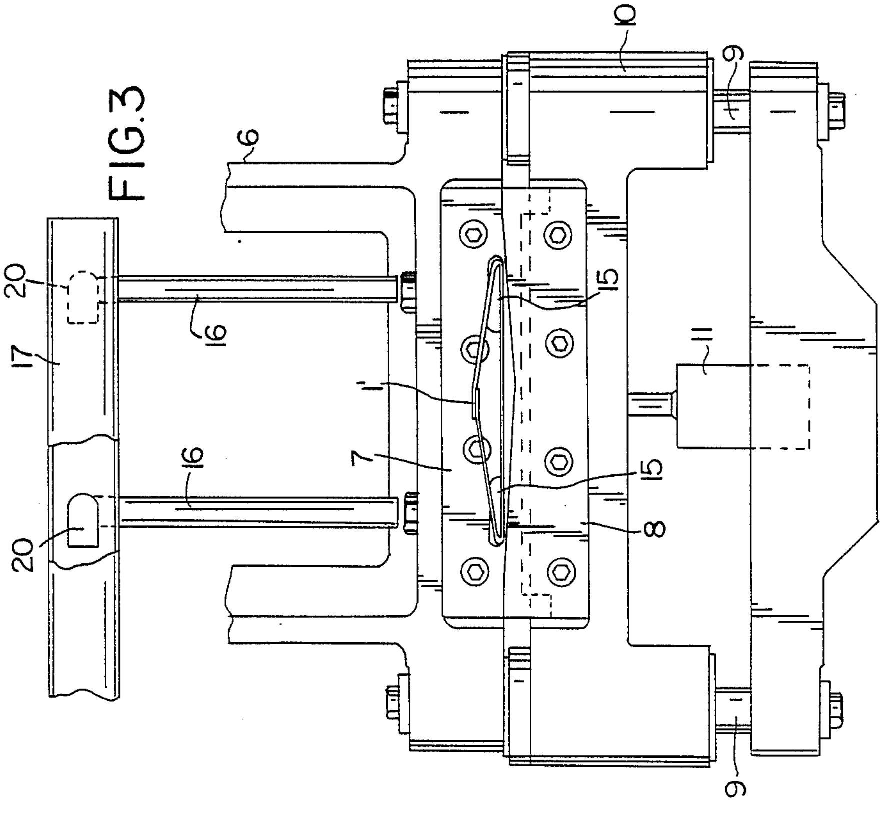
FIG. 3 is an enlarged front view of the cutting blades.

The abovementioned oscillation movement of the blade frame 6 is made by a cylinder 12 in the direction in which the web 1 advances. The notch 3 of the web 1 and the upper blade frame 6 are caused to engage with each other when the blade frame 6 is oscillated by the cylinder 12 towards its advancing direction, and then the lower blade 8 is driven upward by the cylinder 11 to cut the web 1 at a specified position. (See FIGS. 2 and 4)

More specifically, the edges of the upper and lower blades 7 and 8 are separated from each other a distance which is slightly less than the height Z of the inner area of the web 1. Thus, oscillation of the blade frame 6 made by the cylinder 12 is stopped when the edge of the upper blade 7 is engaged with the notch 3 of the web 1. Then, the lower blade supporting block 10 is raised by driving the cylinder 11 so that the web 1 is cut by the upper blade 7 and the lower blade 8.

The upper blade 7 is provided with two oblong suction ports 15 which can face the sectional end of the cut-out cylindrical body 1'. These suction ports 15 are connected to a suction duct 17, which is provided in front of the blade frame 6, by flexible tubes 16, respectively. The suction duct 17 is connected to a blower 18 which sucks the air around the suction ports 15. In the embodiment shown in FIG. 1, air passes through a bag type filter dust collector 19 so that dust (such as paper powder) sucked in together with the air is removed. This dust collector 19 may be of an other type such as an electric dust collector, inertia dust collector, etc.

In the embodiments shown in the drawings, in order to ensure smooth air flow and prevent accumulation of dust residue, elbows 20 are provided in the suction duct 17 in the air flow direction. One end of the elbow 20 opens outside of the tube 16 through the tube wall of the suction duct 17, and the other end of the flexible tube 16 is connected to the suction port 15.

The present invention may be applied to other type of cutting apparatuses aside from one in which the blade frame 6 including the upper and lower blades are oscillated. As long as the upper blade or the lower blade on which the suction port is provided is securely fixed, the suction port and the suction duct can be connected via stationary piping without using a flexible tube. As to the number of the suction port 15 and position thereof, if the sectional end of the cylindrical body 1' is in a range where dust can be sucked by the suction force of the blower (hereafter such range is called the "suction area"), the number and position of the suction ports are not limited to those shown in the drawings.

In the embodiment of FIG. 5, two suction ports 15 are opened at the positions where the sectional end of the cylindrical body 1' face them so that the suction areas A cover the entire sectional end of the cylindrical body 1'.

In the embodiment of FIG. 6, a third suction port 15' is provided between the two suction ports 15 so that the entire sectional end of the cylindrical body 1' is covered by the suction areas A and A' of these suction ports 15 and 15'.

In the embodiments of FIGS. 5 and 6, the suction ports 15 and 15' are provided at positions where they face the inner area 21 of the cylindrical body 1' which is formed by the resiliency of the cut-out cylindrical body 1'. The suction ports 15 may be provided either on the upper or lower blade as long as the suction area of the suction port 15 covers the entire sectional end of the cylindrical body 1'. If the suction ports 15 do not directly face the inner area 21 of the cylindrical body 1', air flowing in the inner area 21 might be disturbed, and effective dust removal could decrease. However, in the cutting apparatus shown in FIGS. 5 and 6 wherein the suction ports 15 and 15' directly face the inner area 21, the cylindrical body 1' itself acts like a tunnel. Accordingly, the air to be sucked out does not create a turbulence inside the cylindrical body 1' but flows as freely and fully as possible. As a result, removal and purification action of not only the paper powder around the sectional end but of the entire inner area of the cylindrical body 1' are accomplished very effectively.

As seen from the above description, according to the web cutting apparatus of this invention, paper powder, etc., which may be generated when the web is cut, can be removed, and there is no possibility that even fine dust will be mixed with the beverage in the container.

In addition, the air to be sucked out can pass through the cylindrical body, thereby enhancing dust removal inside the cylindrical body.

Furthermore, the dust which is sucked out is not discharged into the air after being collected by the dust collector. In other words, contamination of the working environment is also prevented, and the dust will not attach to the web.

In addition, the blades for cutting the web can make a wide range of oscillating movements.

I claim:

1. An apparatus for cutting a tubular web into an individual tubular bodies including a cutting means with an upper blade and a lower blade, said upper and lower blades having sidewalls, suction ports on one of said sidewalls of one of said upper and lower blades, said suction ports facing a cut end of a cut-off tubular body, a suction device connected to said suction ports so as to withdraw air and cut debris from around the cut end of each cut off tubular body.

2. An apparatus according to claim 1, wherein at least a part of said suction ports is disposed at a position directly facing an inner area in the cut-off tubular body, said inner area being formed by the resiliency of the cut-off tubular body.

3. A cutting apparatus according to claim 1 or 2 including a dust collector, wherein air and cut debris drawn in through said suction ports by said suction device is discharged through said dust collector.

4. An apparatus according to claim 1 or 2 including an oscillating blade frame on which said upper blade is fixedly mounted, a pair of guide shafts mounted on said blade frame, said lower blade being vertically movable on said guide shafts.

5. An apparatus according to claim 1 or 2, including a suction duct and suction tubes, said tubes connecting said suction ports to said suction duct, a blower connected to said suction duct for drawing the air and cut debris through said suction duct.

6. An apparatus according to claim 3 including an oscillating blade frame on which said upper blade is fixedly mounted, a pair of guide shafts mounted on said blade frame, said lower blade being vertically movable on said guide shafts.

7. An apparatus according to claim 3, including a suction duct and suction tubes, said tubes connecting said suction ports to said suction duct, a blower connected to said suction duct for drawing the air and cut debris through said suction duct.

8. An apparatus for cutting a tubular web into individual tubular bodies, a cutting means comprising a pair of reciprocating blades which cuts said tubular web into individual tubular bodies, said blades having side walls, a plurality of suction ports on one of said side walls of one of said pair of blades, said suction ports facing a cut end of cut-off tubular body to withdraw air and cut debris from said cut-off tubular body.

* * * * *